United States Patent
Kee et al.

(10) Patent No.: US 9,690,550 B2
(45) Date of Patent: *Jun. 27, 2017

(54) PROGRAM OPTIMIZATION VIA COMPILE TIME EXECUTION

(71) Applicant: NATIONAL INSTRUMENTS CORPORATION, Austin, TX (US)

(72) Inventors: Hojin Kee, Austin, TX (US); Tai A. Ly, Austin, TX (US); Newton G. Petersen, Emporia, KS (US); Jeffrey D. Washington, Round Rock, TX (US); Haoran Yi, Austin, TX (US); Dustyn K. Blasig, Pflugerville, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/704,689

(22) Filed: May 5, 2015

(65) Prior Publication Data

US 2015/0242193 A1 Aug. 27, 2015

Related U.S. Application Data

(63) Continuation of application No. 13/592,995, filed on Aug. 23, 2012, now Pat. No. 9,081,583.

(51) Int. Cl.
*G06F 9/45* (2006.01)
*G06F 9/44* (2006.01)
*G06F 11/36* (2006.01)

(52) U.S. Cl.
CPC .............. *G06F 8/41* (2013.01); *G06F 8/34* (2013.01); *G06F 8/443* (2013.01); *G06F 8/447* (2013.01);

(Continued)

(58) Field of Classification Search
None
See application file for complete search history.

(56) References Cited

U.S. PATENT DOCUMENTS 5,193,190 A 3/1993 Janczyn
6,971,092 B1 11/2005 Chilimbi
(Continued)

OTHER PUBLICATIONS

Sarangi, Smruti R. et al.; "CADRE: Cycle-Accurate Deterministic Replay for Hardware Debugging;" International Conference on Dependable Systems and Networks, Jun. 25-28, 2006, pp. 301-312; DOI: 10.1109/DSN.2006.19 (12 pages).

(Continued)

*Primary Examiner* — Lewis A Bullock, Jr.
*Assistant Examiner* — Mark Gooray
(74) *Attorney, Agent, or Firm* — Meyertons Hood Kivlin Kowert & Goetzel, P.C.; Jeffrey C. Hood; Mark S. Williams

(57) ABSTRACT

When compiling high level, graphical code (e.g. LabVIEW™ code) representative of a design, parts of the code that do not depend on external input data may be executed during the compilation process. Specific variables and/or value traces of specific variables in the program, e.g. constant values and/or repeating patterns may be recorded then analyzed, and certain transformations may be applied in the compilation process according to the results of the analysis, thereby optimizing the design. In one approach, the graph may be dynamically stepped through one node at a time, and it may be determined whether all inputs to the stepped-through node are known. If those inputs are known, type conversion and the operation corresponding to the stepped-through node may be dynamically performed. In another approach, a subset of the graphical code not depending on external data may be compiled and executed, thereby obtaining the same results as described above.

29 Claims, 11 Drawing Sheets

(52) U.S. Cl.
CPC .............. *G06F 8/4435* (2013.01); *G06F 8/48* (2013.01); *G06F 8/49* (2013.01); *G06F 11/3636* (2013.01)

(56) References Cited

U.S. PATENT DOCUMENTS

| | | |
|---|---|---|
| 7,398,522 B2 | 7/2008 | Komatsu |
| 7,669,157 B1 | 2/2010 | Borer |
| 7,730,464 B2 | 6/2010 | Trowbridge |
| 7,788,657 B2 | 8/2010 | Wannamaker |
| 7,840,954 B2 | 11/2010 | Gschwind |
| 7,890,940 B2 | 2/2011 | Komatsu |
| 8,230,406 B2 | 7/2012 | Carbone |
| 8,281,274 B1 | 10/2012 | Padalia |
| 8,327,316 B2 | 12/2012 | Chouinard |
| 8,413,125 B2 | 4/2013 | Lee |
| 8,418,095 B1 | 4/2013 | Neema |
| 8,447,719 B2 | 5/2013 | Bethke |
| 8,453,111 B2 | 5/2013 | Hudson |
| 8,701,098 B2 | 4/2014 | Roediger |
| 2005/0028148 A1 | 2/2005 | Civlin |

OTHER PUBLICATIONS

"Synthesis and Simulation Design Guide: 10.1;" Xilinx User Guide 2008; retrieved on May 28, 2013 pp. 1-218; (218 pages).

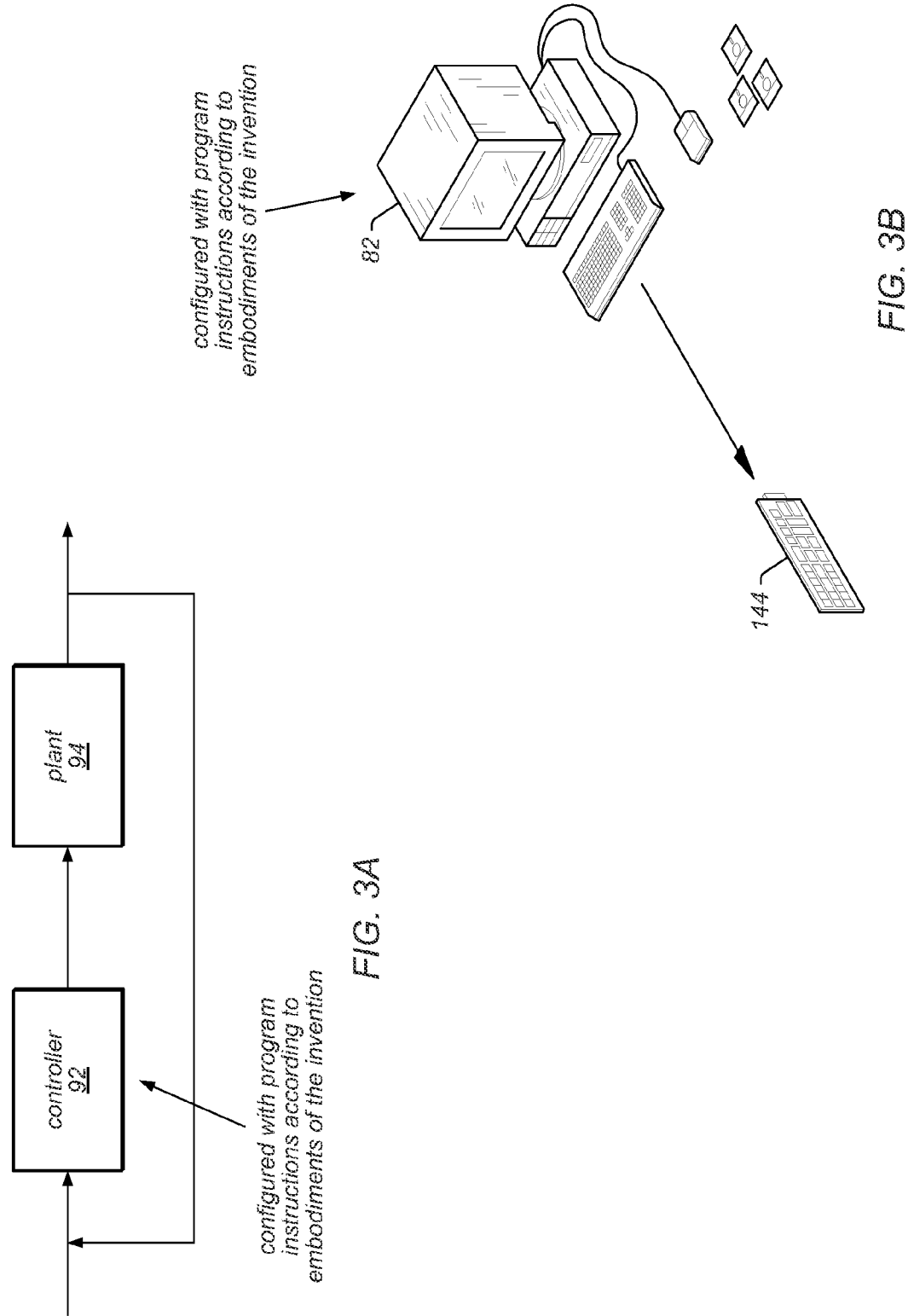

PROGRAM OPTIMIZATION VIA COMPILE TIME EXECUTION

CONTINUATION AND PRIORITY DATA

This application is a continuation of U.S. application Ser. No. 13/592,995, titled "Compile Time Execution", filed Aug. 23, 2012, whose inventors were Hojin Kee, Tai A. Ly, Newton G. Petersen, Jeffrey D. Washington, Haoran Yi, and Dustyn K. Blasig, which issued as U.S. Pat. No. 9,081,583.

FIELD OF THE INVENTION

The present invention relates to the field of programming, and more particularly to a system and method for performing timing accurate debugging.

DESCRIPTION OF THE RELATED ART

Many industrial applications require high-performance and/or efficient implementation, such as, for example, digital signal processing (DSP) applications. Moreover, such applications may be subject to various constraints, e.g., with respect to timing, resource usage, throughput, etc. For example, applications to be implemented in programmable hardware, such as a field programmable gate array (FPGA) may be subject to constraints regarding the application's footprint, i.e., area used, on the FPGA. Many high-performance applications are implemented in accordance with data flow (also referred to as "dataflow") protocols, which facilitate parallelism, particularly in hardware implementations, such as FPGA based targets.

The aforementioned applications implemented in programmable hardware may further be subject to timing and resource constraints with corresponding implications that are often difficult and/or impossible to predict when making choices while constructing high-level models and/or code representative of the applications. For example, such choices may need to be made when using a high level code, e.g. graphical code such as LabVIEW™, and compile it to a working FPGA implementation. It is only well into the compile process (e.g. compiling for Xilinx) that the validity, correctness, or sufficiency of certain values that were specified when making those choices become evident. Prior art techniques for specifying and implementing such applications therefore require significant manual analysis and testing, which is difficult, tedious, and error prone.

Some compiler optimizations rely on knowledge of how certain values of variables (or wires in graphical programming language approaches/implementations) change over time. A constant value or repeating pattern or a range of information can be exploited for higher performance. However, gathering this value information for optimization purposes can be a complex and difficult task, especially when attempting to address the problem algebraically.

SUMMARY OF THE INVENTION

Various embodiments of a system and method for specifying and implementing applications and/or programs are presented below. Specifically, various embodiments may use a novel method for compiling high level, graphical code (e.g. LabVIEW™ code) to another code descriptive of the same design described in the graphical code, and further for performing timing accurate debugging during simulations, analysis, transforms, synthesis, etc. For example, the graphical code may be compiled to a working FPGA. Accordingly, in one set of embodiments, a non-transitory computer-accessible memory medium may store program instructions executable by a computer system to receive an input program representative of a design including one or more functions, and compile the received input program to produce an output. During the compilation process (i.e. during the compile) of the received input program, information about one or more elements of the design may be generated by executing portions of the received input program, analyze the information, and optimize the output by applying transformations to the compilation process according to the analysis of the information.

In some embodiments, the information may relate to specific variables in the design and/or value traces of specific variables in the design. Examples of the specific variables include array indices and variables of a specific data type, e.g. floating-point data type. Examples of the value traces of specific variables include a sequence of values, a sequence of values in combination with loop iteration information, a sequence of values across multiple variables, and a compact expression that can generate values. The portions of the received program that are executed during compilation may represent a portion of the received input program that is data independent, a portion of the received input program that is in a fan in cone of array indices, and/or a few iterations of a loop in the received input program. Analysis of the information may include determining loop iteration distances between array read operations, determining loop iteration distances between array write operations, determining loop iteration distances between array read and write operations, determining repetitive patterns in array accesses to design caching mechanism, collecting statistics of value traces, and/or collecting statistics of value traces across multiple variables. The statistics may represent minimum and maximum values, value ranges, number of bits required to represent values in specific data types, count overflow values, and/or count underflow values, among others.

The transformations applied during the compilation process may include performing a new loop iteration before a current loop iteration finishes, generating pipelining hardware to implement an iterative behavior described by a loop, converting variables from one data type to another data type (e.g. from a floating-point data type to a fixed-point data type), determining a number of bits required to represent a variable, generating machine code implementing access to memories in anticipation of use, generating hardware implementing access to memories in anticipation of use, replacing a variable with a constant, replacing a variable with a look up table of constants, replacing an array variable with multiple array (or non-array) variables, replacing multiple array variables with fewer array variables, replacing one or more array variables with one or more other array variables with different arrangements of elements in the corresponding array variables, reordering memory reads/writes when there is no dependency and/or removing dead code. The input program may be a behavioral description of a piece of software or hardware in any number of programming, machine or hardware description languages. Compiling the input program may involve translating the input program into any other program that describes the behavior of a piece of software or hardware in any number of programming, machine, or hardware description languages. Executing the portions of the input program may involve interpreting the portions of the input program in software that is executed on a computer, compiling the portions of the input program and executing the resulting code on a computer, and/or emulating the portions of the input program on some piece of hardware. Finally, the value traces may be recorded by storing values in memory during compilation, storing values in storage disk during compilation, and/or storing values in storage disk and using it for later compilation.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize graphical programs;

FIG. 3B illustrates an exemplary system which may perform control and/or simulation functions utilizing graphical programs;

Figure 1A:
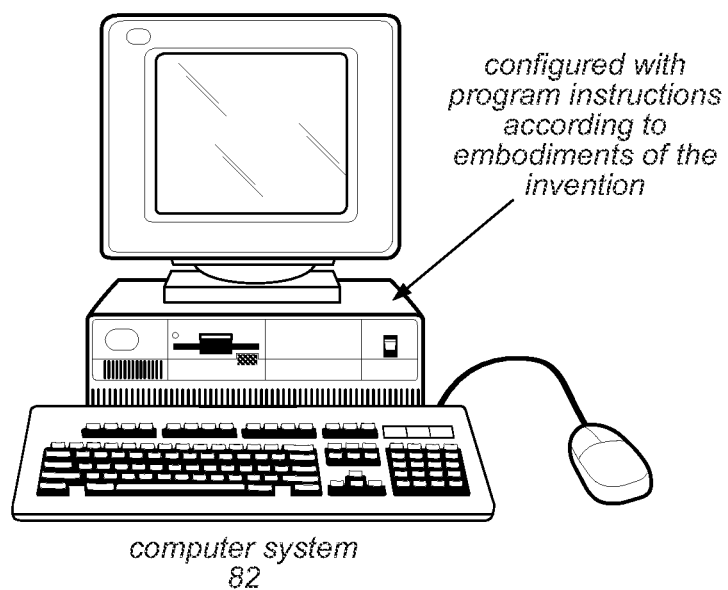
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look-up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as functional blocks, or simply blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes is often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements the functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data.

Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are automatically completed). The present specification provides various examples of operations being automatically performed in response to actions the user has taken.

Disciplined Design Methodology—refers to a design methodology where there is a clear and formal definition of the application specifications and constraints, the platform resources and capabilities, and the quantitative and qualitative interactions between the application specifications and constraints and the platform resources and capabilities models, so that a system/computer can automatically perform operations to navigate the design space, or can aid the user (via a wizard or expert system) to navigate the design space manually.

Application Model—a clear and formal definition of the specifications and constraints of the user application.

Platform Model—a clear and formal definition of the computing and I/O resources and capabilities of the user selected target platform.

Resource Model—an internal model that stores actor definitions (e.g., via tuples) and actor interconnect information, and is an intermediate representation on which code generation may be based.

Platform Library—a library of pre-characterized platform building blocks that the user can assemble to create a platform model. This library can include timing data for blocks.

Specification—refers to part of the diagram or user input that captures the application functionality and reflects the user intent irrespective of the platform on which the application is going to be implemented/deployed.

Constraint—refers to part of the diagram or user input that captures implementation specific user intentions, i.e., those specific to the platform on which the application is going to be implemented/deployed.

Actor—basic (software) unit of computation in a model; conceptually, a sequential process that reads inputs, executes, and produces outputs. An example of an actor is a functional block in a graphical program.

Channel—unbounded point-to-point FIFO buffers between actors.

Production/Consumption Count—the number of data tokens produced/consumed by an actor on a terminal per firing.

Firing—a single execution of an actor that begins when the requisite number of data tokens are present on all its input terminals and the requisite number of empty spaces (storage) are present on all its output terminals. On each firing, an actor consumes data from its input terminals, takes finite time to execute, and produces data on its output terminals.

Static Data Flow (SDF) Actor—an actor for which the number of data tokens consumed and produced by the actor firing on all its terminals is static and specified a priori at edit or compile time.

Cyclo-static Data Flow (CSDF) Actor—an actor which executes as a repeating sequence of phases. Each phase corresponds to a firing of a static dataflow actor for which the number of data tokens consumed and produced are specified a priori.

Parameterized Cyclo-Static Data Flow (PCSDF) Actor—a CSDF actor for which data production and consumption counts and execution behavior are regulated by parameters. The parameter values may be defined at the time the actors or functional blocks are connected together (static), or at run-time (dynamic). In the case of dynamic parameters, these usually determine some modes of operation of the functional blocks or the resulting graphical program. The parameters assume values from a finite set, and are updated only at iteration boundaries.

Heterochronous Data Flow (HDF)—a hierarchical model of Cyclo-Static Data Flow (CSDF) and Finite State Machine (FSM) actors. This model enables a decoupling of control and concurrency. The operational semantics require that state transitions are executed only at iteration boundaries of the SDF model.

Parameterized HDF (PHDF)—a parameterized version of HDF in which actor data production and consumption counts and execution behavior are regulated by parameters (see PCSDF actor definition above). HDF is often defined to include parameterization, and so the designation PHDF is used herein when that specific characteristic is being highlighted.

Parameterized Block—an actor or block (e.g., a functional block) that accepts parameters in the context of PCSDF, or HDF/PHDF.

Schedule—a sequence of actor firings that respects data dependencies and token counts (infinite or periodic).

Iteration—a finite sequence of actor firings that forms a single period of a periodic schedule.

Iteration boundary—the points where an iteration starts or stops.

Deterministic Execution—refers to a type of execution in which any implementation of the application, sequential or concurrent, on any platform, produces the same result.

Deadlock Free Execution—refers to a type of execution in which any implementation of the application does not terminate.

Bounded Execution—refers to a type of execution in which any implementation of the application executes in bounded memory.

Actor Worst Case Execution Time (WCET)—time to complete one actor firing (typical units are cycles or seconds).

Actor Initiation Interval (II)—minimum time between the start of successive actor firings (typical units are cycles or seconds).

Throughput—the number of tokens produced or consumed on a specified port or terminal per unit time (typical units are samples per second or samples per cycle).

Latency (End-To-End)—the time to complete one iteration of the model (typical units are cycles or seconds).

Latency (Computation Path)—the time elapsed along a specific computation path (typical units are cycles or seconds).

Mode—a phase of a functional block's execution (as in CSDF), or a state (or value) of a specification or constraint of a functional block that is configurable at runtime (as in dynamic PCSDF).

Clumping—an optimization method by which FIFO buffers between blocks (which serve as a harnessing boundary) may be removed and replaced with another implementation, e.g., a simple wire, a register, or a combination of FIFO and registers.

Backpressure-less implementation—an implementation style that does not require a downstream actor (e.g., functional block) to control data flowing from upstream actors based on its ability to process data.

Configuration Scope—the set of possible configurations for a configurable functional block, any of its terminals, specifications or constraints. For example, a parameter is defined by a configuration scope for a given parameter port or terminal.

FIG. 1A—Computer System

FIG. 1A illustrates a computer system 82 configured to implement various embodiments of the present invention. Various embodiments of methods for creating a program are described below.

As shown in FIG. 1A, the computer system 82 may include a display device configured to display one or more programs as they are created and/or executed. The display device may also be configured to display a graphical user interface or front panel of the program(s) during execution. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs or software tools which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
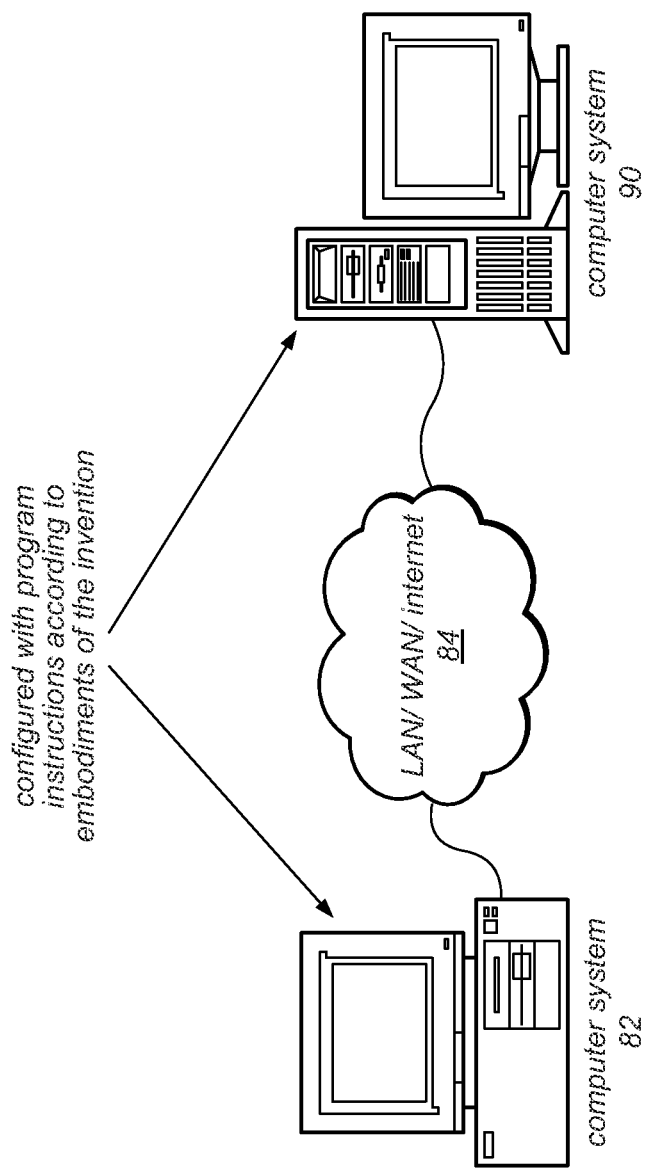
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real-time operating system (RTOS). In one embodiment, the graphical program may be downloaded and executed on the device. For example, an application development environment with which the graphical program is associated may provide support for downloading a graphical program for execution on the device in a real-time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, digital signal processing, etc. Exemplary test applications where the graphical program may be used include hardware-in-the-loop testing and rapid control prototyping, among others.

However, it is noted that embodiments of the present invention can be used for a number of different applications, and are not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
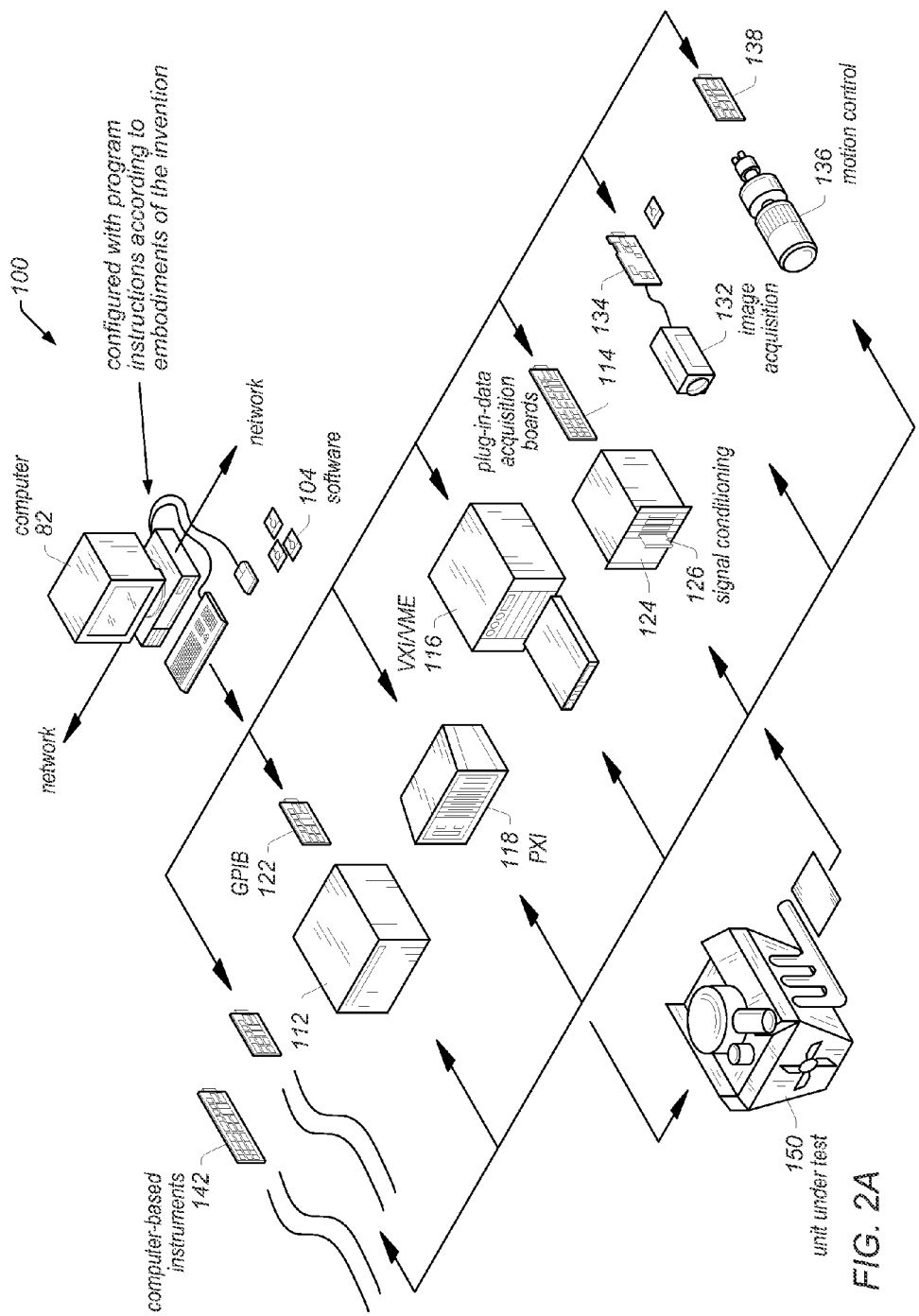
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in or for a digital signal processing application, in a data acquisition and control application, in a test and measurement application, an image processing or machine vision application, a process control application, a man-machine interface application, a simulation application, or a hardware-in-the-loop validation application, among others.

Figure 2B:
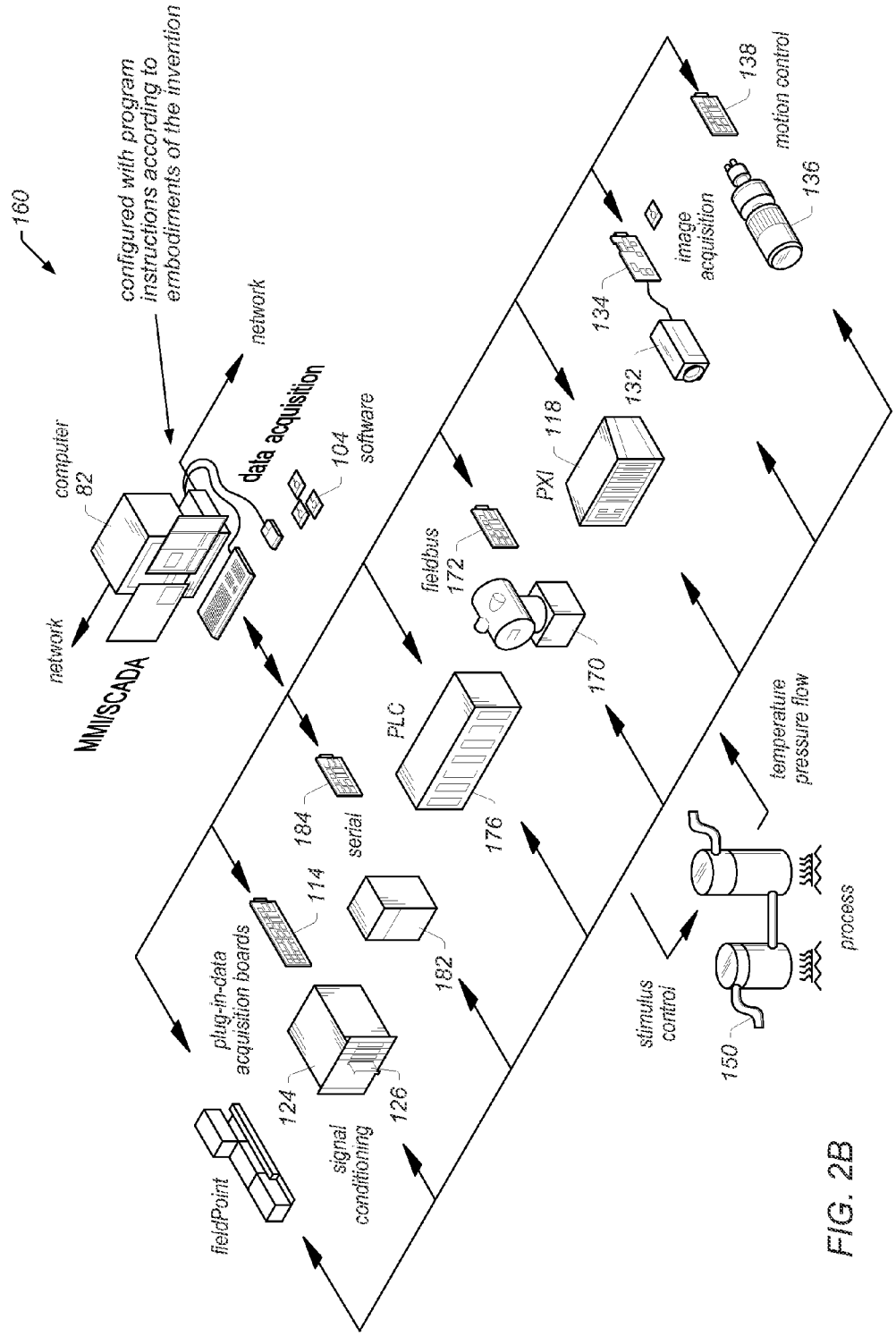
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, such as a graphical program, that specifies or implements the functionality of one or both of the controller 92 and the plant 94. For example, a control engineer may use a modeling and simulation tool to create a model (e.g., graphical program) of the plant 94 and/or to create the algorithm (e.g., graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program, or a program generated based on a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real-time execution, e.g., a device including a processor that executes a real-time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program or a program generated based on a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for digital signal processing, measurement, instrumentation control, industrial automation, modeling, or simulation, such as in the applications shown in FIGS. 2A and 2B, may be referred to as virtual instruments.

Figure 4:
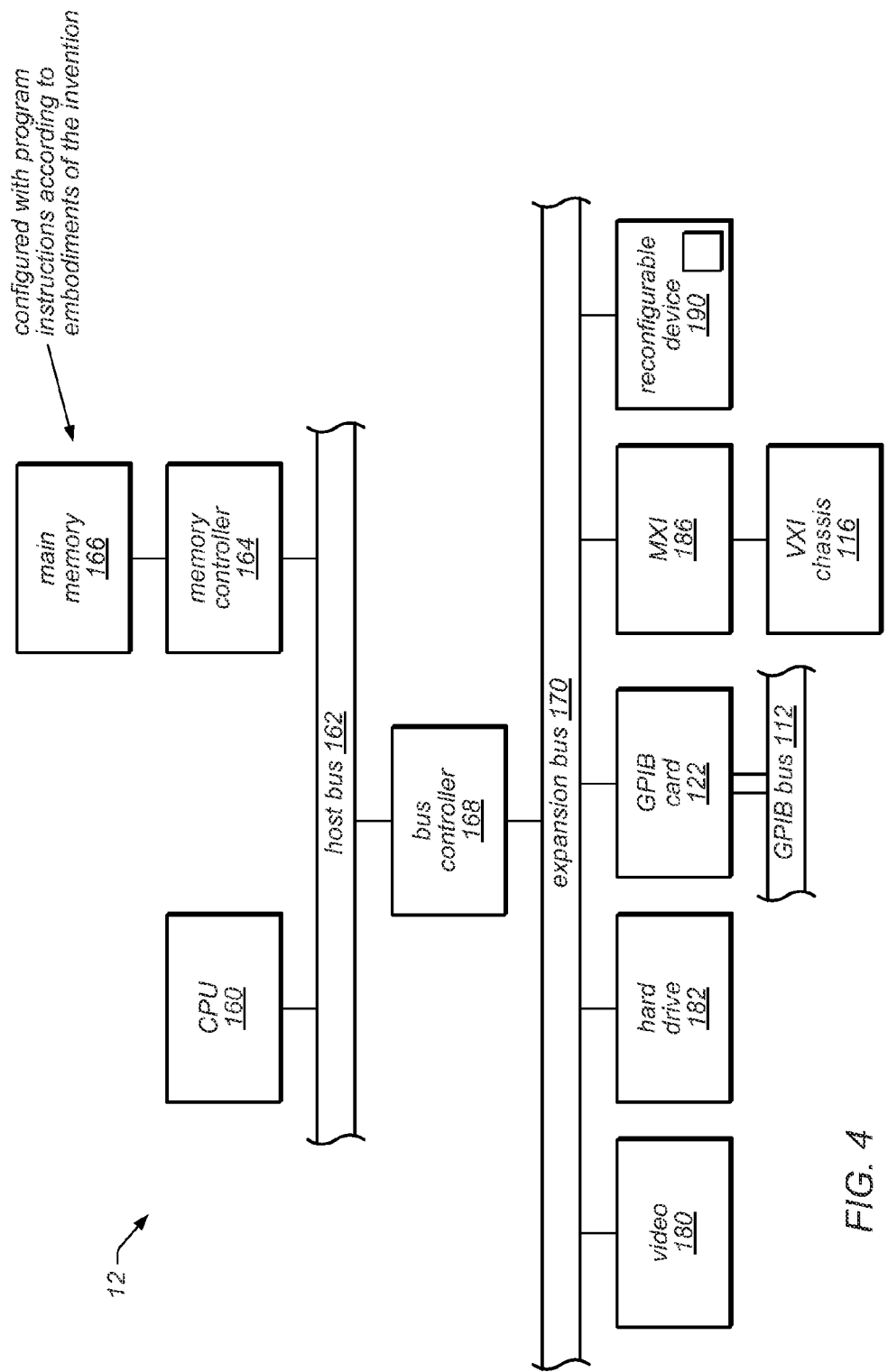
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160, which is coupled to a processor or host bus 162. The CPU 160 may be any of various types, including an x86 processor, e.g., an Intel iCore™ class, a PowerPC processor, a CPU from the SPARC family of RISC processors, or any others, as desired. A memory medium, typically comprising RAM and referred to as main memory, 166 is coupled to the host bus 162 by means of memory controller 164. The main memory 166 may store program instructions implementing embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory, which may execute a RTOS. The device 190 may also or instead comprise a programmable hardware element. The computer system may be configured to deploy a graphical program or a program generated based on a graphical program to the device 190 for execution on the device 190. The deployed program may take the form of graphical program instructions or data structures that directly represent the graphical program, or that were generated based on the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. In some embodiments, the graphical program and/or the program generated from the graphical program are data flow programs. In a further embodiment, the generated program may be a hardware configuration program, and may be deployed to a programmable hardware element. Moreover, in some embodiments, the generated program may be suitable for deployment in a distributed manner, e.g., across multiple, possibly heterogeneous, targets. Thus, for example, a first portion of the program may be directed to a CPU based platform, while another portion may be targeted for a programmable hardware element.

Graphical Specification and Constraint Language

A graphical specification and constraint language may allow, facilitate, or provide for, specification of a model of computation and explicit declaration of constraints for programs, in addition to specifying the program functionality. In various embodiments, the graphical specification and constraint language may be useable via a graphical or textual interface. In other words, the language may be presented to designers with textual and/or graphical syntax.

For example, in one exemplary embodiment, the specification and constraint language may include one or more of the following features:

- formal semantics defined over the graphical design constructs (functional blocks, terminals, wires, etc.) in a (graphical) designer tool;
- the ability to constrain multiple aspects, including structure, behavior and timing; or
- the availability of both graphical and textual syntax.

Constraint usage in a design flow may include one or more of:

- the combination of functional specification (with graphical design constructs in the designer tool) and design intent (with constraints);
- automatic design parameter tuning to meet design intent; or
- automatic constraint manipulation during design transformation (e.g., various optimizations to increase performance or resource utilization).

The specification and constraint language may facilitate analysis and optimization of graphical programs developed in the language. For example, one or more software tools, e.g., a designer tool, may exploit the relationship between the formal dataflow semantics and underlying timing models of target platforms (or hardware actors) for analysis and code generation. By utilizing such (hardware) models in combination with specified constraints via the specification and constraint language, some tasks or operations, such as the "stitching together" of functional blocks, e.g., IP blocks, e.g., for implementation in hardware, may be performed more easily, efficiently, effectively, and/or more reliably, as will be described in more detail below. Note that the terms "designer tool" and "development environment" may be used interchangeably.

Figure 5:
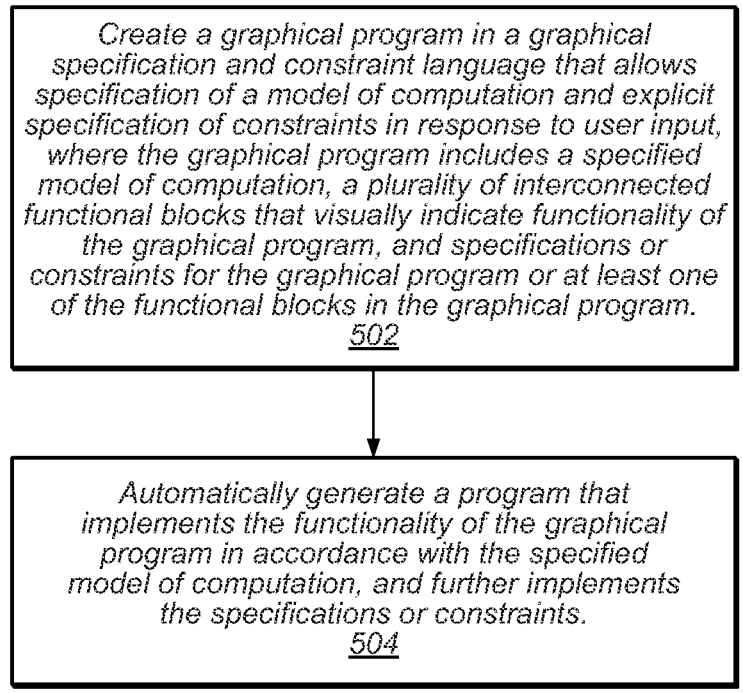
FIG. 5 is a flowchart diagram illustrating one embodiment of a method for creating a program.

FIG. 5—Flowchart of a Method for Creating a Program

FIG. 5 illustrates a method for creating a program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a graphical program (which may be referred to as a diagram) may be created on the computer system 82 (or on a different computer system), e.g., in response to user input. For example, the graphical program may be created or assembled by the user arranging on a display a plurality of nodes or icons (also referred to herein as functional blocks) and then interconnecting the nodes to create the graphical program. In response to the user assembling the graphical program, data structures may be created and stored which represent the graphical program. The nodes may be interconnected in a data flow format, although in other embodiments, at least some of the nodes may be interconnected in a control flow or execution flow format, as desired. The graphical program may thus comprise a plurality of interconnected nodes or icons (functional blocks) which visually indicate the functionality of the program. As noted above, the graphical program may comprise a block diagram and may also include a user interface portion or front panel portion. Where the graphical program includes a user interface portion, the user may optionally assemble the user interface on the display. As one example, the user may use a designer tool to create the graphical program. As another example, the user may use the LabVIEW™ graphical programming development environment (possibly with suitable extensions) to create the graphical program. In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. For example, in an exemplary embodiment, the graphical program implements digital signal processing functionality. The graphical program may be or include a graphical data flow program.

As noted above, in some embodiments, a graphical program development environment may be provided which includes a graphical specification and constraint language that allows specification of a model of computation and explicit declaration of constraints. Thus, in some exemplary embodiments, the graphical program may be written in the graphical data flow specification and constraint language. The graphical data flow program may thus include a specified model of computation, a plurality of interconnected functional blocks that visually indicate functionality of the graphical data flow program in accordance with the specified model of computation, and specifications or constraints for the graphical data flow program or at least one of the functional blocks in the graphical data flow program.

In some embodiments, the specification and constraint language may be considered to be a combination of a specification language and a constraint language, although the two may overlap somewhat, and some distinctions between specifications and constraints may be subtle, e.g., based on context, as discussed below.

In one exemplary embodiment, the graphical program may be developed via a software tool, e.g., a designer tool, which provides a graphical design environment for data flow oriented system design. The basic building constructs in the designer tool may include functional blocks (which may also be referred to simply as "blocks"), terminals, and wires. Blocks may be designed with dataflow semantics, and may communicate with each other via terminals (on the blocks) through wires connecting the blocks. The design process from a user's viewpoint may thus include selecting (and/or creating) the appropriate blocks, arranging them, and connecting the terminals of the blocks using wires. To make the design process more efficient, a rich library of primitive blocks may be provided. Moreover, the designer tool may also provide or accommodate third party function blocks, e.g., IP blocks, and/or user-defined function blocks, which may be organized into a user library.

As noted above, the designer tool may include or utilize a graphical data flow specification and constraint language that allows explicit declaration of constraints, in addition to component-based (e.g., functional blocks and their interconnections) design. Note that constraints may convey certain information more effectively than the component-based design aspects of the language. For example, the component-based design portion of the language, which may be referred to as the component or specification language, may be used to implement or present a "skeleton" of the program or system, which includes individual functional blocks and the structural connectivity among those blocks, whereas constraint-related aspects of the language, which may be referred to as the constraint language, may represent properties associated with the building blocks, with the structural connectivity, with the program or system performance, and so forth. Moreover, rather than simply describing various properties of the blocks or their connectivity, constraints may be used as a means to convey design space exploration intent. Thus, constraints may specify or indicate the direction in which designers would like to tune the system, e.g., to improve or optimize system performance or resource utilization.

Note that a specification is usually within some domain of discourse, while a constraint is generally outside the domain. For example, if the domain of discourse is an untimed model of computation (static dataflow for example), then any timing declaration may be considered a constraint. But if the domain of discourse is timed dataflow, then timing may be part of the specification. There can be different domains of discourse supported by a single designer tool.

In some embodiments, the constraint language may be defined over a set of subjects, such as, for example, entities (including functional blocks, terminals and wires), properties (structural, behavioral or timing) associated with the entities, and constants. In some exemplary embodiments, the specifications or constraints may be with respect to one or more of: throughput of terminals on the functional blocks, throughput of the graphical program, clock rate of the graphical program, buffer sizes between functional blocks, or latency (or delays) between functional block inputs and corresponding functional block outputs, among others.

Relations among entities may be described by Boolean operators, arithmetic operators, or temporal operators. Subjects and relations may thus form the foundation of the specification and constraint language. Note that the language may define precise and formal semantics, but in some embodiments may be presented to designers with both textual syntax and graphical syntax, as mentioned above. Thus, the graphical specification and constraint language may integrate well with or into the graphical design environment of the designer tool.

In some embodiments, the specifications or constraints included in the graphical program may include one or more of:

input count (IC), comprising a number of tokens consumed at an input terminal of the at least one functional block by one firing of the at least one functional block;

output count (OC), comprising a number of tokens produced at an output terminal of the at least one functional block by one firing of the at least one functional block;

execution time (ET), comprising a number of cycles needed by the at least one functional block to complete firing;

initiation interval (II), comprising a minimum number of cycles between firings of the at least one functional block;

input pattern (IP), comprising a sequence of Boolean values, wherein the sequence of Boolean values aligns with the beginning of firing of the at least one functional block, wherein each true value in the sequence denotes consumption of a token at an input terminal of the at least one functional block; or output pattern (OP), comprising a sequence of Boolean values, wherein the sequence of Boolean values aligns with the end of firing of the at least one functional block, wherein each true value in the sequence denotes production of a token at an output terminal of the at least one functional block.

Input and output patterns may be referred to collectively as access patterns.

Note, however, that the above items are meant to be exemplary only, and that other items or terms may be used as desired. For example, in some embodiments, the specifications or constraints may also include information regarding parameters or states of the functional blocks or target platforms. As one example, the ET may specify an amount of time and a flag denoting whether the execution time is exact or worst case. As another example, in some embodiments, the Boolean sequence of the input pattern (IP) or output pattern (OP) may have a length of at most the value of II. As a further example, in some embodiments, the IP and/or OP sequences may not be Boolean, e.g., may be integers, so long as the sum of the sequence elements is equal to IC or OC, respectively.

Note that for the IP sequence, the beginning of the sequence aligns with the beginning of firing, whereas for the OP sequence, the end of the sequence aligns with the end of firing.

In some embodiments, the specifications or constraints may have a standardized format, such that the functional blocks (e.g., IP blocks) can be described by third parties. For example, tools or specifications such as IP-XACT may be extended to include or define an interface for accessing the information regarding implementation and the high-level model of computation for the functional blocks.

In one embodiment, in addition to the foundational or basic constraint language, a set of constraints commonly used by designers may be provided, e.g., throughput constraint, latency constraint, etc., which may not only provide convenience to designers, but may also allow the designer tool to associate or invoke more effective assisting tools to analyze the graphical program with respect to particular constraints. For example, when the designer adds a throughput constraint to the system, a static analysis tool may be invoked to determine the actual throughput, and therefore to determine whether the constraint is met. In contrast, if the designer expresses the same throughput constraint via the basic constraint language, a more elaborate flow may be engaged, e.g., running a simulation tool and checking the timed trace against the constraint.

To meet these unique performance and resource needs, the designer tool may provide a framework for analyzing programs/applications and/or application models, explore trade-offs between performance and resource usage, or select implementation strategies. Through specifications and/or constraints on the graphical program (which may be referred to as a diagram), the designer tool may capture the user's intent for the application and may use the framework to provide early feedback on the design while also generating efficient and high performance implementations.

In 504, a program may be generated that implements the functionality of the graphical program in accordance with the specified model of computation, and further implements the specifications or constraints. In some embodiments, the program may be targeted for implementation in hardware, e.g., the program may be useable to configure a programmable hardware element, such as an FPGA, to perform the functionality subject to the specifications or constraints. For example, the method may include generating a hardware configuration program based on the program, where the hardware configuration program is useable to configure a programmable hardware element, such as an FPGA.

Alternatively, the program may be targeted to a processor based platform, and thus may be compiled and/or interpreted for execution by one or more processors. More generally, in various embodiments, the generated program may be targeted for execution on any of a variety of platforms, including, for example, collections of FPGAs (or other programmable hardware elements), multi-core processors, multi-processor systems, embedded processors, or any combinations thereof. Thus, the platform may be homogenous or heterogeneous, as desired.

In various embodiments, the generated program may be a textual data flow program, e.g., in the C programming language, or a graphical data flow program. For example, the generated data flow program may be a LabVIEW graphical program (VI).

In some embodiments, the generated program or description may not be data flow, but rather may be in an imperative program form. Furthermore, a more specific hardware-centric description, e.g. one at the register transfer level (RTL, e.g., VHDL or Verilog, SystemC), may be used for implementation directly. Similarly, when targeting (instruction level) processors or many cores or graphical processing units (GPUs), descriptions or programs more suitable for those targets may be generated directly, e.g., annotated or modified imperative code, such as C/CUDA (Compute Unified Device Architecture), or OpenCL. Thus, in various embodiments, the generated program may be of any type desired.

In some embodiments, the method may further include analyzing the graphical program, including analyzing the specifications or constraints, thereby producing analysis results. The automatic generation of the program may then be performed based on the analysis results.

In one embodiment, at least some of the model of computation, and specifications or constraints, may be projected onto a lower dimensional space to simplify and speed at least a portion of the analyzing. Examples of such lower-dimensional projections include a simplified model of computation, or a less specified or constrained access pattern. Thus, for example, the analysis tool may chose to ignore access patterns specifications from specific functional blocks, and provide a resulting implementation that consumes all tokens before running a given functional block, and similarly produces all the tokens before signaling a connected functional block that it has completed its operation. Moreover, in some embodiments, simple analysis may be performed in real-time, and complex and more time-consuming analysis may be performed as a background process as time permits in an asynchronous manner, e.g., while the method (e.g., designer tool) performs other functions.

In one embodiment, the steps of the analysis may be stored, codified, or remembered, as a model transformation during (design) exploration, and may be reproduced for either code generation, or secondary (design) exploration.

In some embodiments, the designer tool may utilize or include various models to aid in analyzing the graphical program. For example, in one embodiment, the designer tool may include one or more platform models that may include information regarding target platforms, and/or one or more application models that include information regarding applications or graphical programs. In one embodiment, a platform model is or includes a set (i.e., unchanging) model of a platform element. For example, it may be a model (including for example, clock speed, FPGA resources, etc.) of a piece of hardware or a set of known parameters of a software block, such as, for example, how long it will take to execute, how many resources it will consume, and so forth. An application model is a model of the actual application itself, and includes which blocks are connected together, how will they execute, and so forth.

In one embodiment, the specification or constraints may include one or more user-provided specifications. The method may automatically convert the one or more user-provided specifications into a corresponding one or more constraints before the analyzing and automatically generating the program. For example, a specification for throughput at the model of computation level may result in two constraints at lower levels: a constraint that specifies the clock frequency at which the program on the hardware element should execute, and a constraint on the number of cycles the program should take overall, resulting in a total amount of time that the program takes to execute. Similar constraints can be directly or indirectly applied for buffer sizes and latency.

Further details regarding the analysis of the graphical program are provided below.

Figure 6:
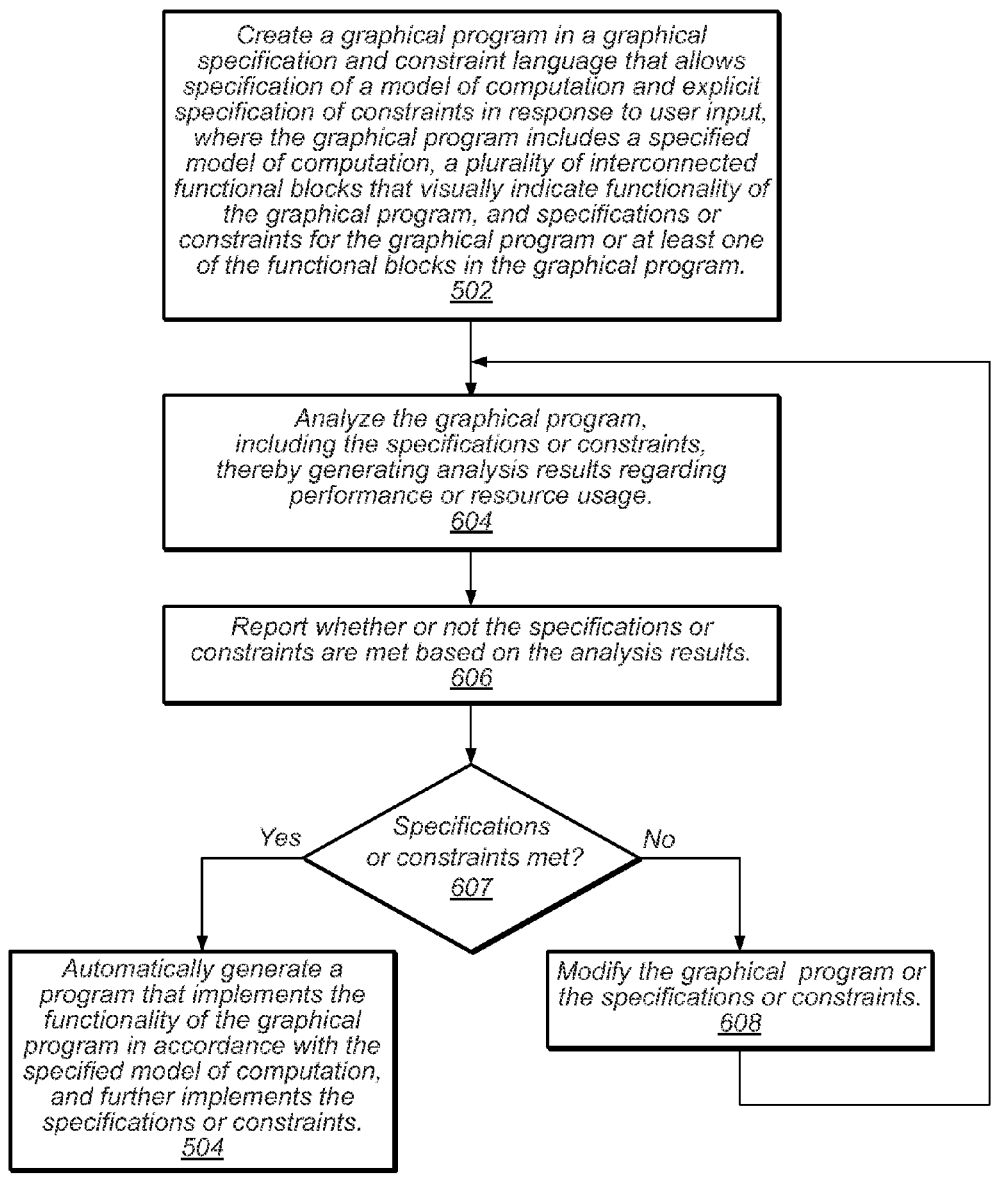
FIG. 6 is a flowchart illustrating a method for developing a program, according to one embodiment.

FIG. 6—Flowchart of a Method for Developing a Program

FIG. 6 illustrates a method for developing a program. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that where method elements are the same or similar to method elements described previously, descriptions may be abbreviated. As shown, this method may operate as follows.

First, in 502 a graphical program (which may be referred to as a diagram) may be created on the computer system 82 (or on a different computer system), e.g., in response to user input, as described above with reference to FIG. 5. As discussed above, in some embodiments, the user may use a designer tool to create the graphical program, while in other embodiments, the user may use a provided graphical program development environment which includes a graphical specification and constraint language that allows specification of a model of computation and explicit declaration of constraints, e.g., the LabVIEW graphical programming development environment (possibly with suitable extensions), to create the graphical program. As also mentioned above, in some embodiments, the graphical program is a graphical data flow program. As described above with reference to FIG. 5, the graphical program may include a specified model of computation, a plurality of interconnected functional blocks that visually indicate functionality of the graphical program in accordance with the specified model of computation, as well as graphically indicated specifications or constraints for at least one of the functional blocks in the graphical program.

Compile Time Execution

As previously mentioned, some compiler optimizations rely on knowing how certain values of variables (or wires in case of a graphical programming language) change over time. A constant value or repeating pattern may be exploited for higher performance. Compile time execution may include executing, during the compilation process, parts or portions of a program that do not depend on external input data. Constant values and/or repeating patterns and/or value ranges may thereby be gathered and used for optimization purposes. One simple example showing the usefulness of knowing certain constant values at compile time is provided below.

Figure 7:
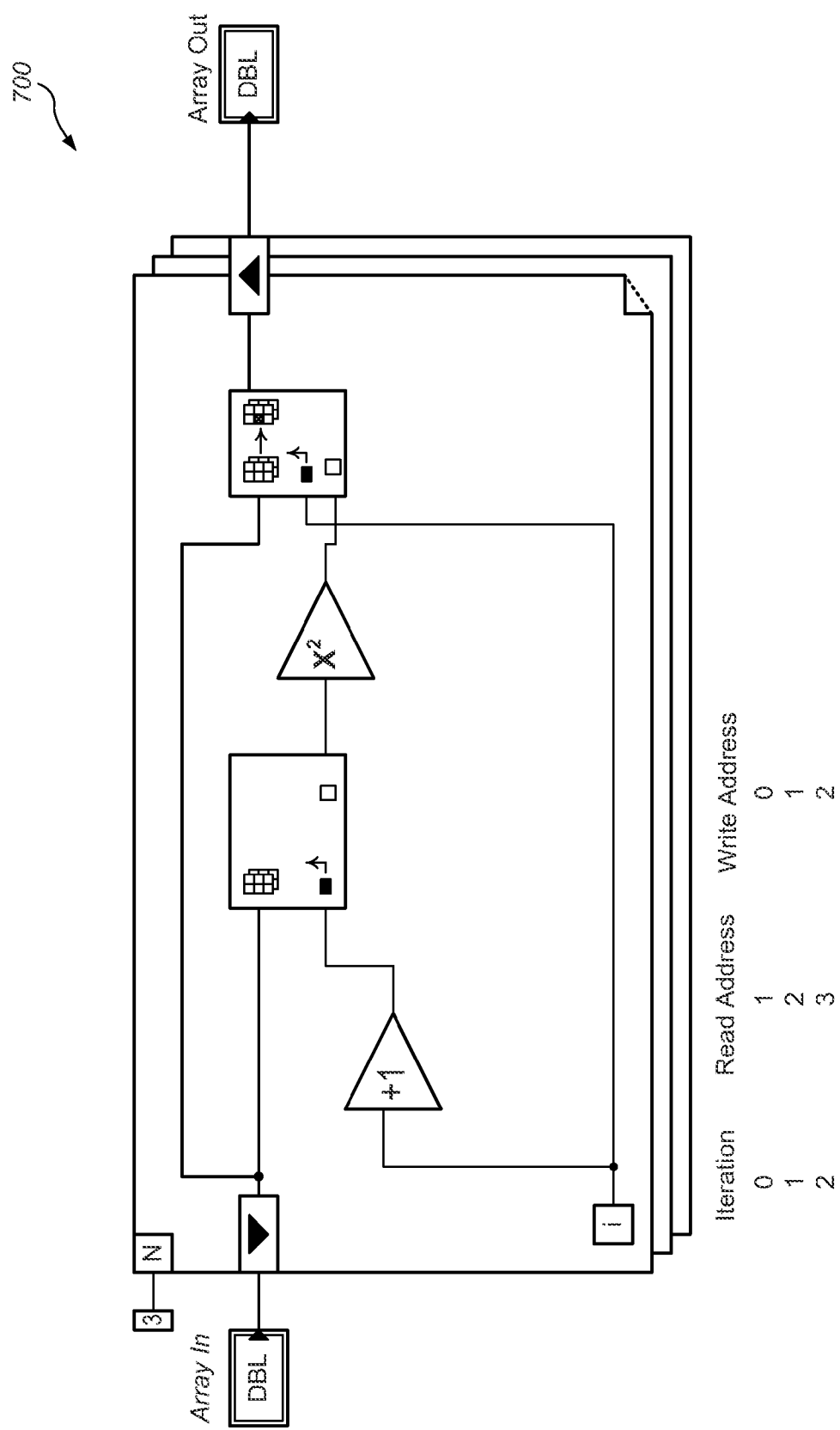
FIG. 7 shows an example of a graphical representation of a simple input program that may be represented in hardware.

FIG. 7 shows the graphical representation of a program input example. The graphical program representation shown in FIG. 7 is for the purpose of highlighting the usefulness of gathering certain values during compilation, and is provided only as an example. As shown in FIG. 7, program 700 loops through three iterations of a FOR loop. Each iteration includes reading from an address that is one higher than the index of the loop iteration (e.g. for iteration '0' the address is '1', for iteration '1' the address is '2', etc.), squaring that read value, and writing the value back to the same array but at an address that equals the loop iteration index (e.g. for iteration '0' writing to address '0', etc).

Without any knowledge about/of the index/address values used for the read and write operations, a read operation performed during a next iteration of the FOR loop cannot start until the write operation in the current iteration has completed, since the value written in the current iteration could possibly be the address read in the next iteration. This prevents pipelining the loop iterations, even though pipelining is a common technique used on parallel hardware architectures, e.g. FPGAs (Field Programmable Gate Arrays) to improve performance. As seen in FIG. 7, the addresses that are read are never addresses that were written in the current iteration or in the previous iteration. Therefore, the read operation of the next/subsequent iteration may be started as soon as possible without any concern for a value that still needs to be written. Making a simplifying assumption that every operation in the loop takes one clock cycle, it would take four clock cycles to execute all the operations of one iteration. If the loop iterations cannot be pipelined, the three iterations may accordingly take twelve clock cycles. However, the loop iterations may be pipelined if the index values were known, resulting in completion of all three iterations in only six clock cycles instead of twelve.

Knowledge of certain values at compile time may also be useful in an optimization technique called array partitioning. Similar to the last example, the array index values may be analyzed for the purpose of splitting large arrays into smaller arrays to exploit more parallelism. Knowledge of certain values at compile time may also be useful in predicting addresses ahead of time (prefetch) for off-chip, high latency memory accesses, and may also aid in simplifying user code. For example, the code may contain a very large-size lookup table, only a subset of which may actually be used. If this were detected, the lookup table size may be reduced and/or the values in the lookup table may even be computed in a way that doesn't necessarily require the lookup table. Conversely, having an expression for which all the value outputs are known may lead to a decision that a better implementation would be a lookup table. By performing compile time execution the values may be known/obtained, and they may be placed into a lookup table as needed.

Knowledge of certain values at compile time may also help automatically convert from floating-point applications to fixed-point applications. If parts of the floating-point application can be run on vectors of data, it becomes possible to determine the bit-width and fixed exponent needed for the required range for each wire/variable. With this information, fixed-point types may be inferred automatically from a floating-point representation. Presently used solutions, such as affine analysis and the omega test attempt to solve this problem algebraically. The simple case shown above may be solved using these methods. However, more complex examples are very difficult or even impossible to solve using an algebraic approach.

Figure 8:
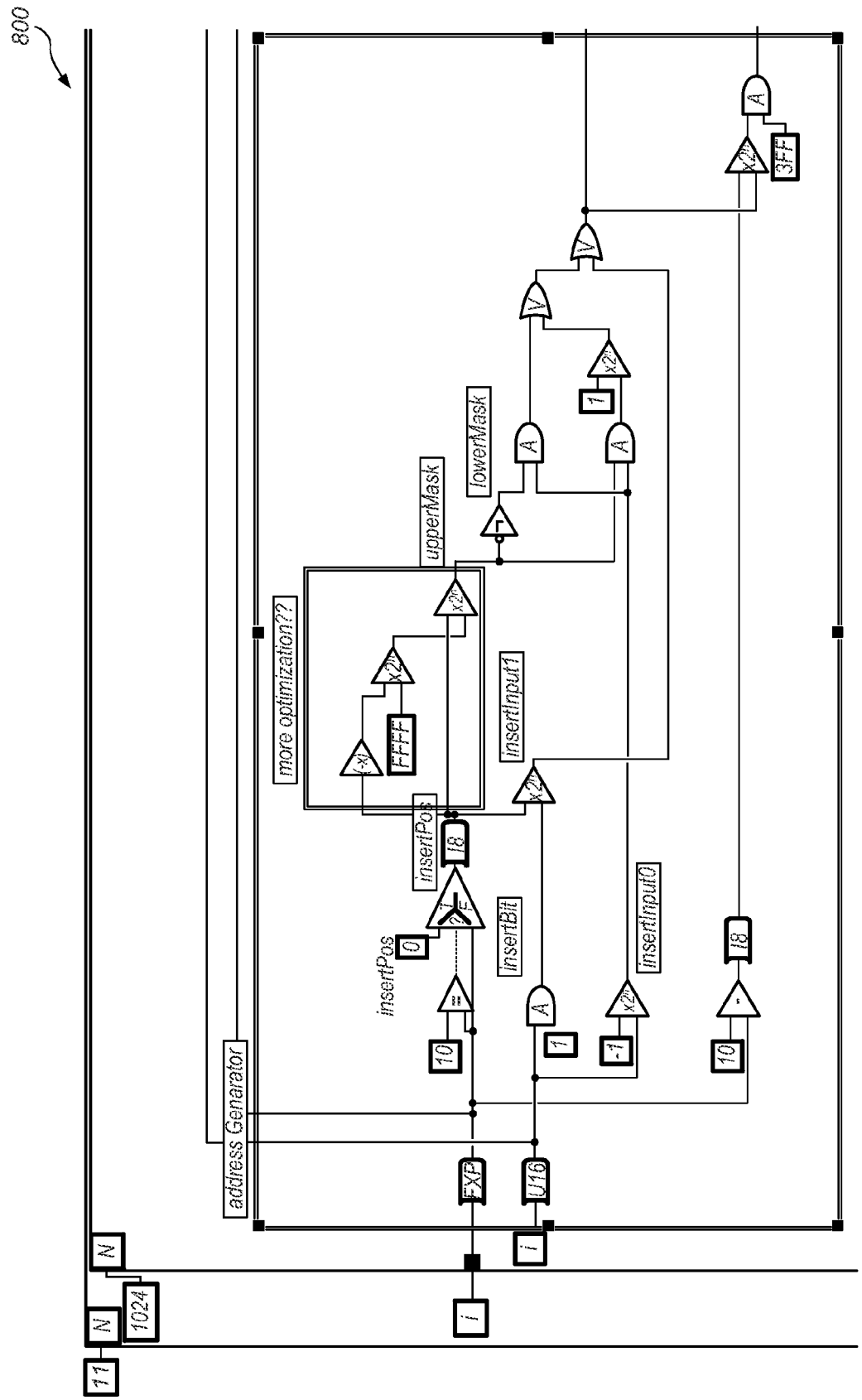
FIG. 8 is an example of a graphical representation of an input program that may be optimized using compile time execution.
Figure 9:
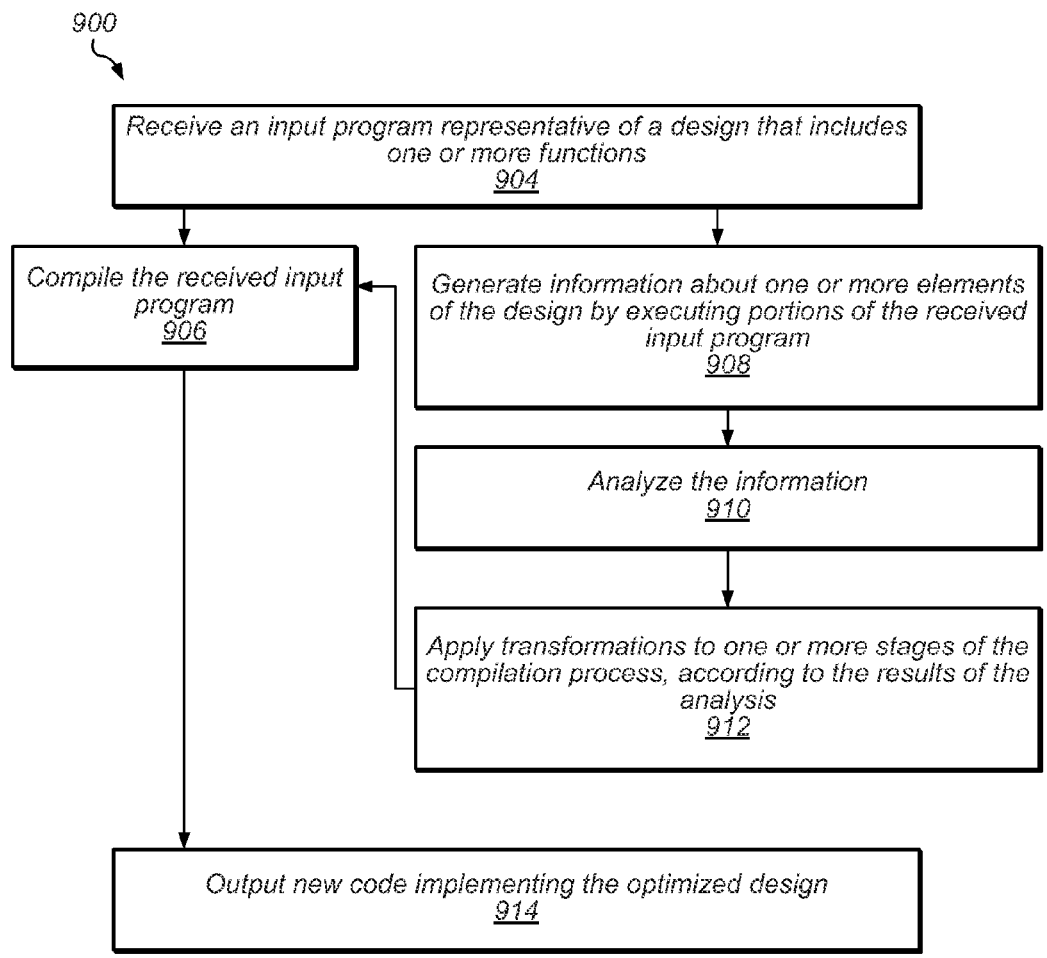
FIG. 9 is a flowchart illustrating a method for compile time execution according to one embodiment.

FIG. 8 shows an example of graphical program input representative of a specific logical function. The code represented by graphical program 800, or at least portions thereof may be executed during the compilation process since they do not depend on any external data sources. The results of the execution may then be examined to deduce the same information that other approaches have to solve for algebraically. FIG. 9 shows a flowchart 900 illustrating compile time execution according to one embodiment. In one set of embodiments, flowchart 900 may be implemented in a computer, with the computer executing the various method steps disclosed in flowchart 900. Accordingly, an input program—representative of a design that includes one or more functions—is received (904), and the received input program is compiled to generate a desired output (906). The desired output may be another program that that describes the behavior of the design in any one of a number of programming languages, machine languages, or hardware description languages. In any case, the output is meant to be representative of the design, or implement the design as required.

During the compilation process—that is, concurrently with the compilation process, and in some cases relying on portions of the compilation process—information is generated about one or more elements of the design by executing portions of the received input program (908). The information may include constant values and/or repeating patterns that may be used for optimization purposes. For example, value traces of specific variables in the design may be recorded/captured as the information. The captured information may then be analyzed (910), and transformations may be applied to one or more stages of the compilation process, according to the results of the analysis (912). Since these transformations may be applied during the compilation, step 912 may also provide input to step 906 as indicated by the arrow from 912 to 906. It should be noted that at least some portions of steps 908-912 may also rely on partial results obtained from compilation 906 while compilation 906 is taking place, and 908-912 are performed concurrently with at least some portions of 906. Finally, the new code—resulting from the compilation of the received input program—implementing the optimized design may be output (914). Further details regarding various embodiments of the steps presented in flowchart 900 are discussed in more detail below.

In one set of embodiments, at least two main approaches may be taken to execute portions of a program or graphical program, such as program 800 at compile time. That is, 908 may be implemented according to at least two different embodiments. In a first embodiment, executing a part of the program input includes a synthetic/interpreted execution. According to this embodiment, the graph (e.g. graph 800) may be stepped through dynamically, one node at a time, and it may be determined if all the inputs to the stepped-through node are known. If all the inputs to the stepped-through node are known, type conversion and the proper operation corresponding to the stepped-through node may be dynamically performed. It should be noted that this may be slow to execute, as many decisions are being made about what steps to execute while trying to run the graph subset. However, one positive aspect is that the graph may be executed 'as is' without having to remove components that rely on external data sources. This is possible because there are numerous opportunities to dynamically make a decision to not execute certain nodes, either because the nodes depend on external data, or because the nodes are constructed in a way that does not make it possible to readily predict values from one run to the next. Accordingly, an infinite feedback is one such graph construct that is preferable to avoid.

A second embodiment of 908 involves compiling and executing a subset of the graph 800. This approach is more complex than interpreted execution because it includes creating a subset of the computation graph, where the subset does not depend on external data and does not contain constructs like infinite state(s) that can cause values to vary from one run to the next. The subset of the computation graph, or sub-graph may then be provided to the compiler for the host execution system. Assembly instructions may be generated such that as many decisions as possible are made at compile time about what portions of the program to run, instead of making those decisions when trying to execute the sub-graph. This yields very efficient execution code and returns results that are typically orders of magnitude faster than those obtained through the first approach.

In some cases it may be useful to not only log the raw sequence of values but also to determine during what iteration of a loop, or during which call to a sub-function a particular value was generated. This may be easily logged along with the values themselves. A specific example of where this may be useful is in a nested loop scenario, where write operations may be occurring at a different nesting depth within the loop than where the read operations take place. Thus, in one set of embodiments, the execution of graphical code, such as LabVIEW code, may include carving out a subset of an application (represented by the graphical code or graphical program), executing it, and using the results to make the rest of the application more optimal. That is, the results from executing the subset of the application may be used to optimize execution of the rest of the application. In another set of embodiments, generated code may be instrumented in such a way that feedback may be returned from an end executing application such that a second compile may be performed more efficiently than the first compile. This may be performed when compile time execution is not possible because of run-time, external data dependencies.

Therefore, in order to optimize compilation of graphical programs, the program itself—or portions thereof—may be executed during compilation of the program, and the value traces of specific variables in the program may be recorded/captured (e.g. 908), then analyzed (e.g. 910) to apply certain transformations in the compilation process (e.g. 912). In one set of embodiments, only a selected part or portion (or portions) of a program may be executed. In such embodiments, the part of the program that is executed may be a "data independent" part, that is, it may be a part of the program that does not depend on any external data input. The part of the program may be in the "fan in cone" of array indices, it may encompass a few iterations of a loop in the program, and/or it may be any combination of one or more of the above.

The specific variables whose values are determined may include array indices, and/or variables of certain data types (e.g., floating point data). Furthermore, the value traces may include sequence of values, a sequence of values in combination with loop iteration information, sequence of values across multiple variables, and/or compact expressions that can generate values but needn't contain the actual numeric values (e.g., formulas such as $x^2+2x+1$). The analysis of the captured value traces and values may include loop iteration distances between array read/write operations, statistics of value traces (e.g., minimum/maximum/count overflow/underflow), and/or statistics of value traces across multiple variables (e.g., minimum/maximum/count overflow/underflow).

In some embodiments, the transformation may include loop pipelining (start executing a new loop iteration before current loop iteration finishes), generation of pipelining hardware to implement an iterative behavior described by a loop, data type conversion of variables, for example from floating-point data types to fixed-point data types, determination of number of bits required to represent variable (in hardware or machine code or software), generation of machine code or hardware to access memories in anticipation of use, replacement of a variable by a constant or a look up table of constants, replacement of an array variable by multiple array (or non-array) variables, reshape the array layout, and/or removal of dead code.

The program itself may be a description of behavior of a piece of software or hardware in any number of programming, machine or hardware description languages, while the compilation process may involve the translation of the selected "program" into any other "program" that describes the behavior of a piece of software or hardware in any number of programming, machine, or hardware description languages. Execution of the selected part or portion(s) of the program may include interpreting a program or part of a program in software executed on some computer, compiling a program or part of a program and executing the code on some computer, and/or emulating a program or part of a program on some hardware. Finally, the value traces may be recorded/captured by storing values in memory during compilation, storing values in storage disk during compilation, and/or storing values in storage disk for use in a later compilation.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium that stores program instructions executable by a computer system to:
   receive an input program representative of a design comprising one or more functions;
   compile the received input program to produce an output;
   during the compile of the received input program, after the compile starts, and before the compile completes:
   generate information about one or more elements of the design by executing portions of the received input program, wherein the portions are less than the entire input program, wherein at least one portion of the received input program are array indices in the input program, wherein the information comprises information about value traces of at least one of the one or more variables in the input program, and wherein said executing comprises:
   determining and executing compiled executable instructions implementing each of the portions of the received program;
   analyze the information; and
   optimize the output by applying one or more transformations to the compile, including applying one or more transformations to arrays or array operations in the input program, responsive to analyzing the information.

2. The non-transitory computer-accessible memory medium of claim 1, wherein the value traces of specific variables comprise one or more of:
   a sequence of values;
   a sequence of values in combination with loop iteration information;
   a sequence of values in combination with multiple nested loop iteration information;
   a sequence of values in combination with caller stack information;
   a sequence of values across multiple variables; or
   a compact expression that can generate values.

3. The non-transitory computer-accessible memory medium of claim 1, wherein the portions of the received input program comprise one or more of:
   a portion of the received input program that is data independent;
   a portion of the received input program that is in a fan in cone of array indices; or
   a few iterations of a loop in the received input program.

4. The non-transitory computer-accessible memory medium of claim 1, wherein the program instructions executable to analyze the information comprise one or more of:
   program instructions executable to determine loop iteration distances between array read operations;
   program instructions executable to determine loop iteration distances between array write operations;
   program instructions executable to determine loop iteration distances between array read and array write operations;
   program instructions executable to collect statistics of value traces; or
   program instructions executable to collect statistics of value traces across multiple variables.

5. The non-transitory computer-accessible memory medium of claim 4, wherein the statistics comprise one or more of:
   minimum value;
   maximum value;
   value ranges;
   repetitive patterns;
   number of bits required to represent values in specific data types;
   count overflow value; or count underflow value.

6. The non-transitory computer-accessible memory medium of claim 1, wherein the program instructions executable to apply transformations to the compile comprise one or more of:
   program instructions executable to perform a new loop iteration before a current loop iteration finishes;
   program instructions executable to generate pipelining hardware implementing an iterative behavior described by a loop;
   program instructions executable to convert variables from one data type to another data type;
   program instructions executable to determine a number of bits required to represent a variable;
   program instructions executable to generate machine code implementing access to memories in anticipation of use;
   program instructions executable to generate hardware implementing access to memories in anticipation of use;
   program instructions executable to replace a variable with a constant;
   program instructions executable to replace a variable with a look-up table of constants;
   program instructions executable to replace an array variable with one or more of:
   multiple array variables;
   multiple non-array variables;
   program instructions executable to replace multiple array variables with fewer array variables;
   program instructions executable to replace one or more array variables with one or more other array variables with different arrangements of elements; or
   program instructions executable to remove dead code.

7. The non-transitory computer-accessible memory medium of claim 1, wherein the input program comprises one or more of:
   a behavioral description of a piece of software in one or more of:
      a programming language;
      a machine language; or
      a hardware description language; or
   a behavioral description of a piece of hardware in one or more of:
      a programming language;
      a machine language; or
      a hardware description language.

8. The non-transitory computer-accessible memory medium of claim 1, wherein the program instructions executable to compile the input program comprise program instructions executable to:
   translate the input program into another program that comprises a behavioral description of the design in one of:
      a programming language;
      a machine language; or
      a hardware description language.

9. The non-transitory computer-accessible memory medium of claim 1, wherein executing the portions of the received input program comprises one or more of:
   interpreting the portions of the program in software executed on a computer;
   executing, on the computer, code obtained from having compiled the portions of the program; or
   emulating the portions of the program on hardware.

10. The non-transitory computer-accessible memory medium of claim 1, wherein the program instructions are further executable to:
   during the compile of the received input program, store the information in one or more of:
      memory; or
      storage disk.

11. The non-transitory computer-accessible memory medium of claim 10, wherein the program instructions are further executable to:
   use the stored information in a future compilation.

12. A computer-implemented method, comprising:
   receiving an input program representative of a design comprising one or more functions;
   compiling the received input program to produce an output representative of the design;
   during said compiling of the received input program, after the compile starts, and before the compile completes:
   generating information about one or more elements of the design by executing portions of the received input program, wherein the portions are less than the entire input program, wherein at least one portion of the received input program are array indices in the input program, wherein the information comprises information about value traces of at least one of the one or more variables in the input program, and wherein said executing comprises:
      determining and executing compiled executable instructions implementing each of the portions of the received program;
   analyzing the information; and
   optimizing the output by applying transformations to one or more stages of said compiling, including applying one or more transformations to arrays or array operations in the input program, responsive to said analyzing the information.

13. The computer-implemented method of claim 12, wherein the input program comprises graphical code, and the output is a program that comprises a hardware description language representation of the design.

14. The computer-implemented method of claim 12, wherein the value traces of specific variables comprise one or more of:
   a sequence of values;
   a sequence of values in combination with loop iteration information;
   a sequence of values in combination with multiple nested loop iteration information;
   a sequence of values in combination with caller stack information;
   a sequence of values across multiple variables; or
   a compact expression that can generate values.

15. The computer-implemented method of claim 12, wherein the portions of the received input program comprise one or more of:
   a portion of the received input program that is data independent;
   a portion of the received input program that is in a fan in cone of array indices; or
   a few iterations of a loop in the received input program.

16. The computer-implemented method of claim 12, wherein said analyzing the information comprises one or more of:
   determining loop iteration distances between array read operations;
   determining loop iteration distances between array write operations;
   determining loop iteration distances between array read and array write operations;
   collecting statistics of value traces; or
   collecting statistics of value traces across multiple variables.

17. The computer-implemented method of claim 16, wherein the statistics comprise one or more of:
   minimum value;
   maximum value;
   value ranges;
   repetitive patterns;
   number of bits required to represent values in specific data types;
   count overflow value; or
   count underflow value.

18. The computer-implemented method of claim 12, wherein said applying the transformations comprises one or more of:
   performing a new loop iteration before a current loop iteration finishes;
   generating pipelining hardware implementing an iterative behavior described by a loop;
   converting variables from one data type to another data type;
   determining a number of bits required to represent a variable;
   generating machine code implementing access to memories in anticipation of use;
   generating hardware implementing access to memories in anticipation of use;
   replacing a variable by a constant;
   replacing a variable by a look-up table of constants;
   replacing an array variable by one or more of:
      multiple array variables; or
      multiple non-array variables;

replacing multiple array variables with fewer array variables;

replacing one or more array variables with one or more other array variables with different arrangements of elements; or removing dead code.

19. The computer-implemented method of claim 12, wherein the input program comprises one or more of:
   a behavioral description of a piece of software in one or more of:
      a programming language;
      a machine language; or
      a hardware description language; or
   a behavioral description of a piece of hardware in one or more of:
      a programming language;
      a machine language; or
      a hardware description language.

20. The computer-implemented method of claim 12, wherein said compiling the received input program comprises translating the input program into another program that comprises a behavioral description of the design in one of:
   a programming language;
   a machine language; or
   a hardware description language.

21. The computer-implemented method of claim 12, wherein said executing the portions of the received input program comprises one or more of:
   interpreting the portions of the program in software executing on a computer;
   executing, on the computer, code obtained from already compiled portions of the program; or
   emulating the portions of the program on hardware.

22. The computer-implemented method of claim 12, further comprising: storing the information, during said compiling, in one or more of:
   a memory; or
   a storage disk.

23. The computer-implemented method of claim 22, further comprising:
   using the stored information at a later compilation.

24. A system, comprising:
   a processing element; and
   a memory medium, coupled to the processing element, wherein the memory medium stores program instructions executable by the processing element to:
   receive an input program representative of a design comprising one or more functions;
   compile the received input program to produce an output;
   during the compile of the received input program, after the compile starts, and before the compile completes:
      generate information about one or more elements of the design by executing portions of the received input program, wherein the portions are less than the entire input program, wherein at least one portion of the received input program are array indices in the input program, wherein the information comprises information about value traces of at least one of the one or more variables in the input program, and wherein said executing comprises:
      determining and executing compiled executable instructions implementing each of the portions of the received program;
      analyze the information; and
      optimize the output by applying transformations to the compile, including applying one or more transformations to arrays or array operations in the input program, responsive to analyzing the information.

25. The system of claim 23, wherein the information further comprises one or more of:
   constant values; or
   repeating patterns.

26. The system of claim 23, wherein the portions of the received input program do not depend on external data input.

27. The system of claim 23, wherein the received input program comprises graphical code comprising at least one node, and wherein executing the portions of the received input program comprises:
   dynamically stepping through the graphical code one node at a time;
   determining whether all inputs to the stepped through node are known; and
   performing dynamically, when all the inputs to the stepped through node are known, one or more of:
      a type conversion; or
      an operation corresponding to the stepped through node.

28. The system of claim 23, wherein the received input program comprises graphical code comprising at least one node, and wherein executing the portions of the received input program comprises:
   generating corresponding code by compiling the portions of the received input program; and
   executing the generated corresponding code.

29. The system of claim 23, wherein said compiling the portions of the received input program comprises:
   creating a sub-graph of the graphical code, wherein the sub-graph corresponds to the portions of the received input program, and wherein the sub-graph does not depend on external data; and
   compiling the sub-graph.

* * * * *